(12) United States Patent
Plutowski et al.

(10) Patent No.: US 6,995,537 B1
(45) Date of Patent: Feb. 7, 2006

(54) CLOSED-LOOP CONTROL SYSTEM TO MITIGATE PWM SWITCHING NOISE

(75) Inventors: Eugene Francis Plutowski, Rochester, MN (US); Kevin W. Ziemer, Plano, TX (US); Alaa Y. El-Sherif, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/057,511

(22) Filed: Feb. 14, 2005

(51) Int. Cl.
*H02P 7/00* (2006.01)
*G11B 15/52* (2006.01)

(52) U.S. Cl. ............... 318/590; 318/254; 318/560; 318/561; 318/599; 369/47.28; 369/47.38

(58) Field of Classification Search ........... 318/560, 318/561, 590, 599, 254, 608; 369/47.28, 369/47.38, 53.35; 323/280; 360/75
See application file for complete search history.

(56) References Cited

U.S. PATENT DOCUMENTS

| | | | | |
|---|---|---|---|---|
| 5,557,184 A | * | 9/1996 | Hwang | ............ 318/608 |
| 5,689,162 A | | 11/1997 | Li | |
| 5,731,670 A | * | 3/1998 | Galbiati et al. | ............ 318/254 |
| 6,023,143 A | * | 2/2000 | Salina et al. | ............ 318/599 |
| 6,078,119 A | * | 6/2000 | Satoh et al. | ............ 310/90.5 |
| 6,141,306 A | * | 10/2000 | Andoh | ............ 369/53.35 |
| 6,219,318 B1 | * | 4/2001 | Andoh | ............ 369/47.28 |
| 6,552,979 B1 | * | 4/2003 | Mokry et al. | ............ 369/47.38 |
| 6,631,045 B1 | * | 10/2003 | Pedrazzini | ............ 360/75 |
| 6,757,129 B2 | | 6/2004 | Kuroiwa et al. | |
| 6,798,157 B2 | | 9/2004 | Takahashi et al. | |
| 6,803,750 B2 | | 10/2004 | Zhang | |
| 6,804,131 B2 | * | 10/2004 | Galbiati et al. | ............ 363/132 |
| 6,828,753 B2 | | 12/2004 | Grasso et al. | |
| 2002/0186491 A1 | | 12/2002 | Hill | |
| 2003/0155896 A1 | * | 8/2003 | Ezio et al. | ............ 323/280 |

* cited by examiner

*Primary Examiner*—Paul Ip
(74) *Attorney, Agent, or Firm*—W. Daniel Swayze, Jr.; W. James Brady; Frederick J. Telecky, Jr.

(57) ABSTRACT

One aspect of the present invention provides a motor control system that includes a linear control system operative, in a linear mode, to provide a plurality of control signals for driving an associated motor based on an error signal. The system also includes control logic operative, in a pulse-width modulation (PWM) mode, to provide the plurality of control signals for driving the motor, at least some of the plurality of control signals being pulse-width-modulated signals based on the error signal. An error system generates the error signal based on an indication of a sensed electrical characteristic of the motor relative to a predetermined reference signal. A feedback network is coupled across the error system. The feedback configured to have transfer function characteristics that substantially match responses in the linear mode and the PWM mode of motor control system, which facilitates transitions between the linear mode and the PWM mode.

20 Claims, 4 Drawing Sheets

CLOSED-LOOP CONTROL SYSTEM TO MITIGATE PWM SWITCHING NOISE

TECHNICAL FIELD

This invention relates generally to control systems and, more particularly to a closed loop control system to mitigate PWM switching noise.

BACKGROUND

Various control schemes exist for driving electrical current through an associated load. The particular scheme or combination of schemes generally depends on the type of load and performance requirements of the system. For example, two known approaches for driving a load include Pulse Width Modulation (PWM) and linear current control. In linear control, the current is driven as a linear function of an input signal, such as a control voltage. For PWM control, the load is driven between alternating high and low voltages to control electrical current in that load. Usually, a PWM scheme utilizes power switch devices (e.g., field effect transistors) coupled across the load. The PWM control system selectively activates the switch devices from high to low conditions or from low to high conditions to electrically couple the load to an associated voltage level. Various power applications can employ a PWM scheme, a linear scheme or a dual PWM and linear scheme to provide desired current and/or voltage to an associated load.

By way of example, magnetic disk drives remain a dominant technology for mass read/write storage in modern computers, including both desktop computer workstations, portable computer devices (e.g., laptop computers, portable audio systems and players), and various types of set top boxes for a variety of applications (e.g., gaming as well as satellite and cable television). A hard disk drive generally includes one or more rotating disks or platters and a spindle motor that is controlled to cause the disks to rotate. Data is generally stored in the form of a sequence of magnetically polarized regions on the surface of the disk. One or more read/write heads, which is sensitive to changes in magnetic flux, reads and/or writes data to the disks as it is supported by an arm above the surface of the disks in close proximity relative to the disks. An actuator motor (typically a voice coil motor (VCM)) controls the positioning of the arm for moving read/write heads relative to the surface of the disks.

Voice coil motor control circuitry generally provides drive signals to the voice coil motor through one or more stages of driver circuitry. The driver circuitry is coupled to drive switch devices connected on opposite sides of the voice coil motor. In operation, the positioning arm is moved radially along the surface of the disk in one direction by driving current through the voice coil motor in one direction, and moved radially in the opposite direction by the driving current through the voice coil motor in the opposite direction. The amount of current through the motor, regardless of current direction, generally determines the speed at which the positioning arm is moved. Generally, a linear control scheme is employed for current near a zero-crossing point (e.g., slow speeds) and a PWM control scheme is employed when greater amounts of current are required (e.g., for higher speeds).

SUMMARY

The present invention relates to a closed loop control system to mitigate pulse-width modulation (PWM) switching noise.

One aspect of the present invention provides a motor control system that includes a linear control system operative, in a linear mode, to provide a plurality of control signals for driving an associated motor based on an error signal. The system also includes control logic operative, in a PWM mode, to provide the plurality of control signals for driving the motor, at least some of the plurality of control signals being pulse-width-modulated signals based on the error signal. An error system generates the error signal based on an indication of a sensed electrical characteristic of the motor relative to a predetermined reference signal. A feedback network is coupled across the error system. The feedback configured to have transfer function characteristics that substantially match responses in the linear mode and the PWM mode of motor control system, which facilitates transitions between the linear mode and the PWM mode. Additionally, by sensing current through the motor at one side of the motor, the effects of switching noise associated with driving the motor can be reduced to enable improved performance since less noise is injected into the feedback network. As a result, the motor control system is useful for high performance applications, such as including controlling an actuator (or voice coil motor) of a hard disk drive system.

The system may further be configurable to implement a dual-sided or single-sided PWM scheme. For example, the control logic can include a dual-sided control system operative to independently pulse-width modulate a first set of the plurality of control signals to control a first set of switch devices associated with a first side of the motor and a second set of the plurality of control signals to control a second set of switch devices associated with a second side of the motor. The control logic can also include a single-sided control system operative, when enabled, to provide the first set of the plurality of control signals for controlling direction of current through the motor and to pulse-width modulate the second set of the plurality of control signals generated to control a magnitude of the current through the motor. Circuitry can also be provided to select which of the dual-sided or single-sided PWM scheme to implement.

DETAILED DESCRIPTION

Figure 1:
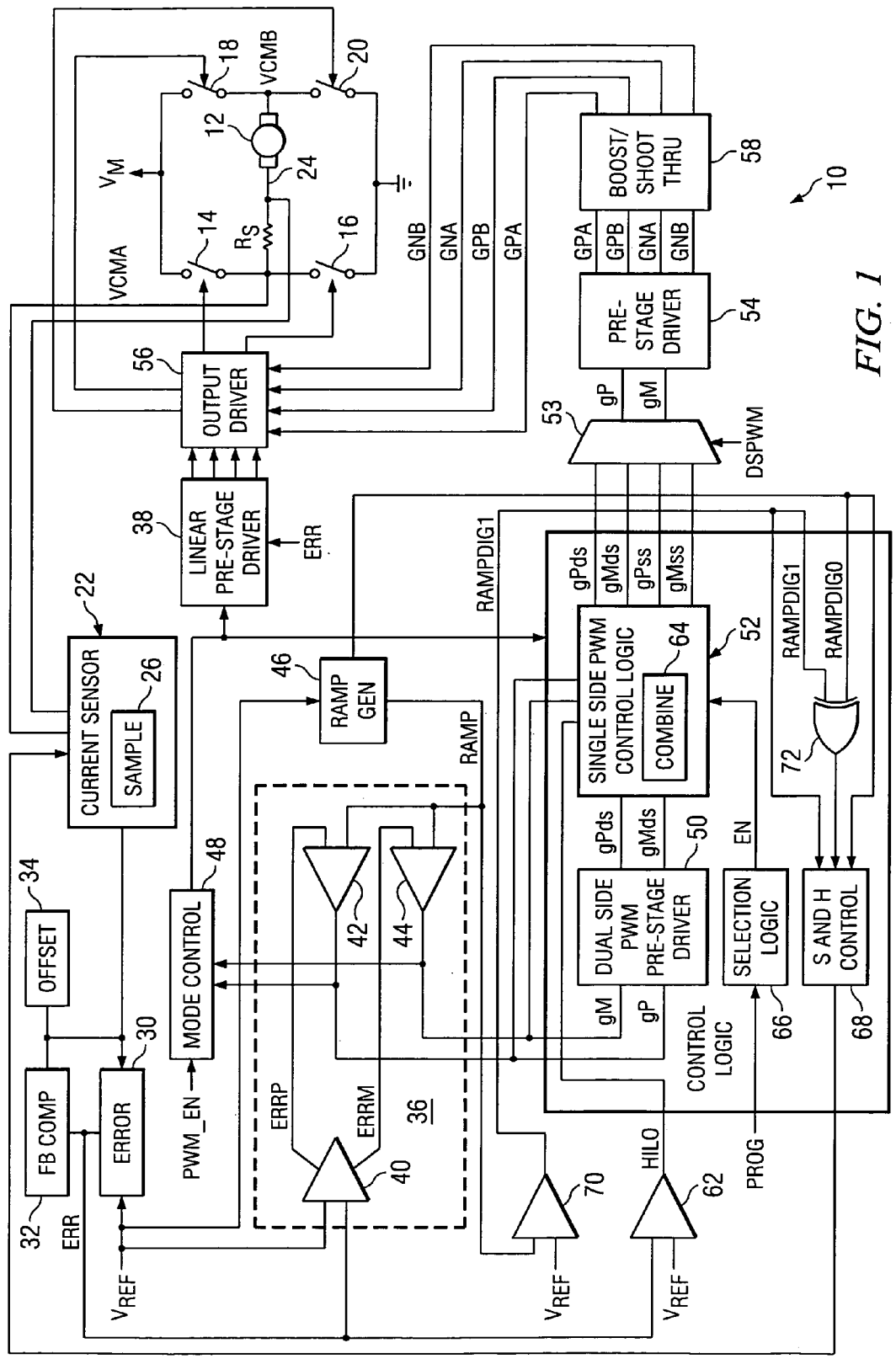
FIG. 1 depicts an example of a motor control system according to an aspect of the present invention.

FIG. 1 depicts an example of a control system 10 that can be utilized to control an associated motor 12. The control system 10 is implemented as a close loop control configured in a manner that achieves a high common mode rejection and is substantially immune to switching noise associated with energizing the motor 12. The control system 10 is operative to drive associated switch devices 14, 16, 18 and 20 for providing desired electric current through the motor 12. As used herein, the term "switch device" is intended to include, but is not limited to, any semiconductor or solid state component or combination of components that can control the flow of current based on a control input applied to the component or combination of components. For instance, the switch devices 14, 16, 18 and 20 may be field effect transistors, either P-type or N-type. The particular type of switch devices can vary for a given application and performance requirements.

In the example of FIG. 1, the switch devices 14, 16, 18 and 20 are arranged in an H-bridge configuration between a motor supply voltage $V_M$ and electrical ground. The switch devices 14 and 16 are connected to supply electrical current to the motor 12 via a VCMA node, corresponding to side A of the H-bridge. Similarly, switch devices 18 and 20 are connected to supply current to the motor 12 via a VCMB node, corresponding to side B of the H-bridge.

As described herein, the control system 10 can operate in dual modes, namely a pulse width modulation (PWM) mode and a linear mode. For instance, the linear mode (e.g., Class A, Class B, or Class AB mode) can be utilized for supplying low current through the motor 12, such as near a zero crossing point. The PWM mode (e.g., class D PWM mode) can be utilized for supplying higher current through the motor, including positive or negative current. In the context of a hard disk drive system, for example, the PWM mode is typically utilized for performing a seek operation.

The system 10 employs means for sensing current through the motor 12. For example, a current sensor 22 is coupled across a current sense resistor $R_S$ for sensing electrical current phase and magnitude through the motor 12. The resistor $R_S$ is coupled between the motor, at node 24, and the VCMA node. Since the sense resistor $R_S$ is connected at only one side (side A) of the motor 12, the sense resistor $R_S$ and the current flowing through $R_S$ is subject to switching noise generally from only switch devices 14 and 16. The voltage across the current sense register $R_S$ is provided as inputs to the current sensor 22. Switching noise from switch devices 18 and 20 is attenuated at node 24 by the inductive and resistive load of the motor 12, thus injecting less noise on to Rs and corresponding feedback. Those skilled in the art will appreciate other approaches that can be utilized to sense the current through the motor 12.

The current sensor 22 includes sample circuitry 26 that activates to sample the voltage across the current sense resister $R_S$ based on a sample control signal from associated control logic 28. According to an aspect of the present invention, the sample circuitry 26 is controlled to sample the voltage across $R_S$ near a center of a PWM current pulse to provide a substantially mean value of the motor current. For instance, the control logic 28 can provide the control signal to activate the sample circuitry 26 at the center of an on or off portion of a PWM current pulse. This helps reduce ripple that is fed back into the feedback path of the closed loop control system 10. The sample circuitry 26 can be implemented as sample and hold circuitry that samples and holds an indication of the sensed current for at least a substantial portion of the PWM cycle. Various types and configurations sample and hold circuits can be utilized. The current sensor 22 provides the indication of sensed current (or other electrical characteristic associated with the motor) as feedback to an error system 30.

The error system 30 can be implemented as including an error amplifier that generates an error signal indicated at ERR. The error system 30 generates the ERR signal as a function the sensed current and a reference voltage, $V_{REF}$. A feedback compensation network 32 is coupled across (e.g., between an input and the output of) the error system 30 to provide desirable gain matching characteristics as part of a closed loop control system. For instance, the compensation network 32 can be configured so that the transconductance gain (magnitude and phase) for the PWM mode substantially matches the transconductance gain for the linear mode. Such gain matching characteristics facilitates smooth transitions between a linear mode and PWM mode implemented by the control system 10. As an example, the feedback network 32, which may be internal or external relative to an integrated circuit implementing the control system 10, may include an RC network of a capacitor and resistor coupled in series between the input and output of the error system 30. Offset circuitry 34 can also be utilized to introduce a DC offset voltage for calibrating a desired zero current point for the control system 10.

The error amplifier provides the ERR signal to a PWM pulse generation system 36 as well as to a linear pre-stage driver 38. That is, the ERR signal is utilized as feedback for controlling operation of the motor 12 during the linear mode via the linear pre-stage driver 38 as well as during a PWM mode, via the PWM pulse generation system 36 and control logic 28. As described below, the operation of the sample circuitry 26 of the current sensor 22 can also be controlled based on the ERR signal generated by the error system 30.

The PWM pulse generation system 36 includes a differential operational amplifier (op amp) 40 that provides differential output signals based on the ERR signal relative to the VREF signal. A positive differential error signal (ERRP) is provided to a first comparator 42 and the negative corresponding differential error signal (ERRM) is provided to a second comparator 44. Each of the comparators 42 and 44 also receives as an input a corresponding RAMP signal. The RAMP signal can be provided by a ramp generator 46 as a function of and centered relative to the reference voltage $V_{REF}$. Each of the comparators 42 and 44 can compare a respective differential error signal relative to the RAMP signal to provide corresponding raw PWM signals. In particular, the comparator 42 can provide a positive PWM signal, indicated at gP, and the comparator 44 can provide a raw negative PWM signal, indicated at gM. The comparators provide the respective signals gP and gM to the control logic 28. The control logic 28 controls the switch devices 14, 16 18 and 20 of the H-bridge during the PWM mode based on the PWM control signals gP and gM, which are derived based on the ERR signal.

As mentioned above, the control system 10 can operate in a linear mode as well as a PWM mode. Accordingly, the control system 10 includes mode control logic 48 that can be utilized to implement transitions between the linear mode and the PWM mode. The mode control block 48, for example, selectively enables and disables the PWM control logic 28 and the corresponding linear pre-stage driver logic 38 based on the outputs of the respective comparators 42 and 44. In another method, the mode control logic 48 can select the mode based on the ERR signal directly. In another method, a control signal PWM_EN can be commanded by an external controller such as a digital signal processor (or other circuitry) or by setting a value of an associated register. The PWM_EN signal operates to enable and disable the PWM mode.

According to an aspect of the present invention, the control system 10 can operate in one or more PWM modes. For example, the control logic 28 can be configured to implement a dual-sided PWM mode in which both sets of switches 14 and 16 and 18 and 20 are pulse-width modulated. Additionally, the control logic 28 can implement a single-sided PWM scheme in which only one side of the H-bridge, namely switch devices 18 and 20 are pulse-width modulated and the other side, comprising switch devices 14 and 16, are utilized to control the direction of current flow through the motor 12. Thus, the control logic 28 includes a dual-sided PWM pre-stage driver 50 to control dual-sided PWM as well as single-sided PWM control logic circuitry 52 for implementing a single-sided PWM control scheme. The selection of single or dual-sided PWM scheme by the control system can be set, for example, by setting a PWM mode program (PROG) signal, such as can be user configurable (e.g., by setting a corresponding control register or data field).

Those skilled in the art will understand and appreciate various dual-sided PWM schemes that can be utilized for controlling current through the motor. By dual-sided PWM, it is meant that the switch devices 14 and 16 at side A of the H-bridge and switch devices 18 and 20 at side B of the H-bridge are pulse-width modulated independently of each other. The PWM cycle need not be constant. It is the variation and overlap between the respective PWM control signals (defined by their duty cycles) that results in current flowing through the motor 12.

For instance, the dual-sided pre-stage driver 50 can be utilized to generate corresponding gate control signal indicated at gpds for side A switch device 14 and 16 and signal gMds for side B switch devices 18 and 20. The gpds and gMds signals can be provided to a pre-stage driver 54, such as through the single sided control logic 52 and a multiplexer 53. The pre-stage driver 54 amplifies the respective signals gP and gM from the multiplexer (corresponding to gpds and gMds) to provide corresponding amplified control signals GPA, GPB, GNA and GNB, which are provided to an output stage driver 56. By way of example, the gate control signal gpds controls GPA, where GPA=$\overline{GNA}$, and gMds controls GPB, where GPB=$\overline{GNB}$. The output driver 56 in turn provides respective GPA, GPB, GNA and GNB signals for pulse-width modulating the respective switch devices 14, 16, 18 and 20. For instance, the output driver 56 thus provides control signals to the respective switch devices with alternating high and low voltage values, although the PWM cycles for each side of the bridge are centered relative to each other. As an example, the overall PWM frequency of the current flowing through the motor 12 for dual-sided PWM may be twice that of the PWM frequency on each side of the bridge since overlap in the PWM associated with each side of the H-bridge can occur twice each PWM cycle.

Protection circuitry 58 can also be provided between the pre-stage driver 54 and the output driver 56 to mitigate transient currents associated with the on and off switching of the respective switch devices 14, 16, 18 and 20. For instance, the protection circuitry 58 can provide boost and shoot-through protection.

For the single-sided PWM scheme, the single-sided PWM control block 52 controls the switch devices 14 and 16 on side A of the H-bridge, which is the half bridge connected to the current sensor 22, to control the direction of current through the motor 12. For example, the single-sided control logic 52 turns on either switch device 14 or 16 depending on which direction current is required to flow. For instance, the single-sided control block 52 thus generates the control signal gPss as current direction control that is applied to switch devices 14 and 16. The single-sided PWM control block 52 also pulse width modulates the switch devices 18 and 20 at side B of the H-bridge to control the magnitude of current through the motor. For example, the single-sided control block 52 generates the gMss control signals for controlling the respective switch devices 18 and 20 based on the control signals already being generated by the dual-sided control block 50 in response to the signals from comparators 42 and 44. Those skilled in the art will appreciate various other approaches that can be utilized to implement single-sided PWM control.

By way of further example of FIG. 1, the ERR signal is provided to an input of a comparator 62. The comparator 62 compares the ERR signal relative to $V_{REF}$ and provides a HILO signal as its output. The single-sided control block 52 utilizes the HILO signal to control the switch devices 14 and 16 to implement desired directional current control with the H-bridge. For instance, the single-sided control block generates gPss based on the HILO signal for implement the directional current control at side A of the H-bridge.

The single-side PWM control logic block 52 also implements logic to control the magnitude of the current through the motor by pulse width modulating switch devices 18 and 20 associated with side B of the H-bridge. In the example of FIG. 1, the single-sided PWM control block 52 also includes combine logic 64 that performs logic based on the gP and gM signals generated by the dual-sided logic 50 and based on the HILO signal. For instance, the combine logic 64 can combine the signals by exclusive-ORing gpds and gMds signals and then exclusive-ORing that result with the HILO signal, i.e., gMss=(gpds⊕gMds)⊕HILO. The single-sided control logic 52 employs the results of the combine logic block 64 to pulse-width modulate switch devices 18 or 20 at side B of the half bridge (e.g., via signals gMss). This results in the pulse width modulation at twice the frequency than typically would be utilized for a comparable dual-sided PWM control scheme implemented by the dual-sided pre-stage driver 50.

The single sided control logic 52 can output corresponding signals gpds and gMds (for implementing dual-sided PWM) and signals gPss and gMss (for implementing single-sided PWM. A multiplexer 53 can select which set of signals to provide as outputs gP and gM according to which PWM mode is being implemented. For instance a signal DSPWM, which can be provided by a controller or stored in a register, provides a value that sets the PWM mode. For example, if DSPWM=1, the multiplexer 53 provides gP=gpds and gM=gMds. Similarly, if DSPWM=0, the multiplexer provides gP=gPss and gM=gMss.

Since the current is sensed at side A of the bridge where the switch devices 14 and 16 are switching much more slowly than the switch devices 18 and 20 that are being pulse width modulated in a single-sided PWM scheme, there is reduced switching noise introduced into the feedback loop through the sensed current $R_S$. Additional efficiencies are achieved since the single-sided control scheme derives its control at least in part from the signals generated by the dual-sided pre-stage driver.

The control logic block 28 can also include selection logic 66 that is operative to enable the single-side PWM control logic 52. The selection logic 66, for example, provides an enable (EN) signal to the single-side PWM control logic based on the PROG signal, which may be user programmable (e.g., by setting a value of an associated register). The single-side PWM control logic 52 performs the logic operations for providing the directional current control and pulse width modulation of the switch devices 18 and 20 when enabled by the EN signal. In contrast, when the single-side PWM logic block is not enabled to implement single-sided PWM control (e.g., based on the PROG signal to selection logic 66), the gpds and gMds signals generated by the dual-side pre-stage driver 50 can be passed through (or bypass) the single-sided PWM control logic 52 to the pre-stage gate driver 54, provided that the system 10 is operating in the PWM mode.

The control logic 28 also includes sample and hold control logic circuitry 68 that is operative to control operation of the sample circuitry 26 based on the ERR signal. By way of further example, the ramp generator 46 provides the RAMPDIG0 signal for use by the sample and hold control logic 68. A comparator 70 generates the RAMPDIG1 signal by comparing VREF to RAMP, also for use by the sample and hold control logic 68. Alternatively, the ramp generator 46 can include circuitry to generate both the RAMPDIG0 and RAMPDIG1 signals. The RAMPDIG0 signal corresponds to a square wave having substantially the same frequency as the RAMP signal (e.g., generally corresponding to the derivative of the RAMP signal with respect to time). The RAMPDIG1 signal corresponds to a square wave having substantially the same frequency as the RAMP signal that is phase-shifted/delayed 90 electrical degrees. The RAMPDIG0 and RAMPDIG1 signals are provided to respective inputs of an X-OR gate 72. The X-OR gate performs an exclusive-OR function relative to the RAMPDIG0 and RAMPDIG1 signals to provide a corresponding clock signal to the sample and hold control logic 68. The sample and hold control logic 68 employs the clock signal from the X-OR gate 72 as well as the RAMPDIG0 and RAMPDIG1 signals to generate a sample control signal that is substantially aligned with a center of current pulse of a PWM cycle. Those skilled in the art will understand and appreciate various types and implementations of circuitry that could be utilized to provide the sample control signal.

By providing the sample control signal to activate the sample circuitry 26 to sense current near the center of PWM cycle, the current sensor 22 samples the mean current through the motor for a given PWM cycle. The mean current value simulates a linear current. Additionally, by sampling the mean current near the center of a PWM current pulse (e.g., either high or low) the amount of switching noise injected to the current sensed across $R_S$ at the VCMA side of the H-bridge can be mitigated, further increasing the precision associated with the ERR signal and the circuitry that operates based on the ERR signal.

As one example, the sample and hold control logic 68 can control the sample circuitry 26 to sample motor current at the center of a pulse of motor current having greater than a fifty percent duty cycle. As an alternative, the sample and hold control logic 68 can be configured to activate the sample circuitry 26 to sample the current through $R_S$ at the center of a PWM current pulse through the motor 12, provided that the pulse width is greater than forty percent of the duty cycle. This which may result in sampling both on and off current pulses. Those skilled in the art will understand and appreciate various ranges of duty cycles can be utilized so that the sampling by the sample circuitry 26 is performed to mitigate the effect of switching noise from switch devices 14 and 16 on the sensed current through $R_S$. Additionally or alternatively, the sample and hold control logic 68 can sample at different points of the PWM motor current through the motor, either the "on" portion of the PWM period or the "off" portion of the PWM period, depending on which portion of the pulse corresponds to a greater percentage of the PWM cycle time.

Figure 2:
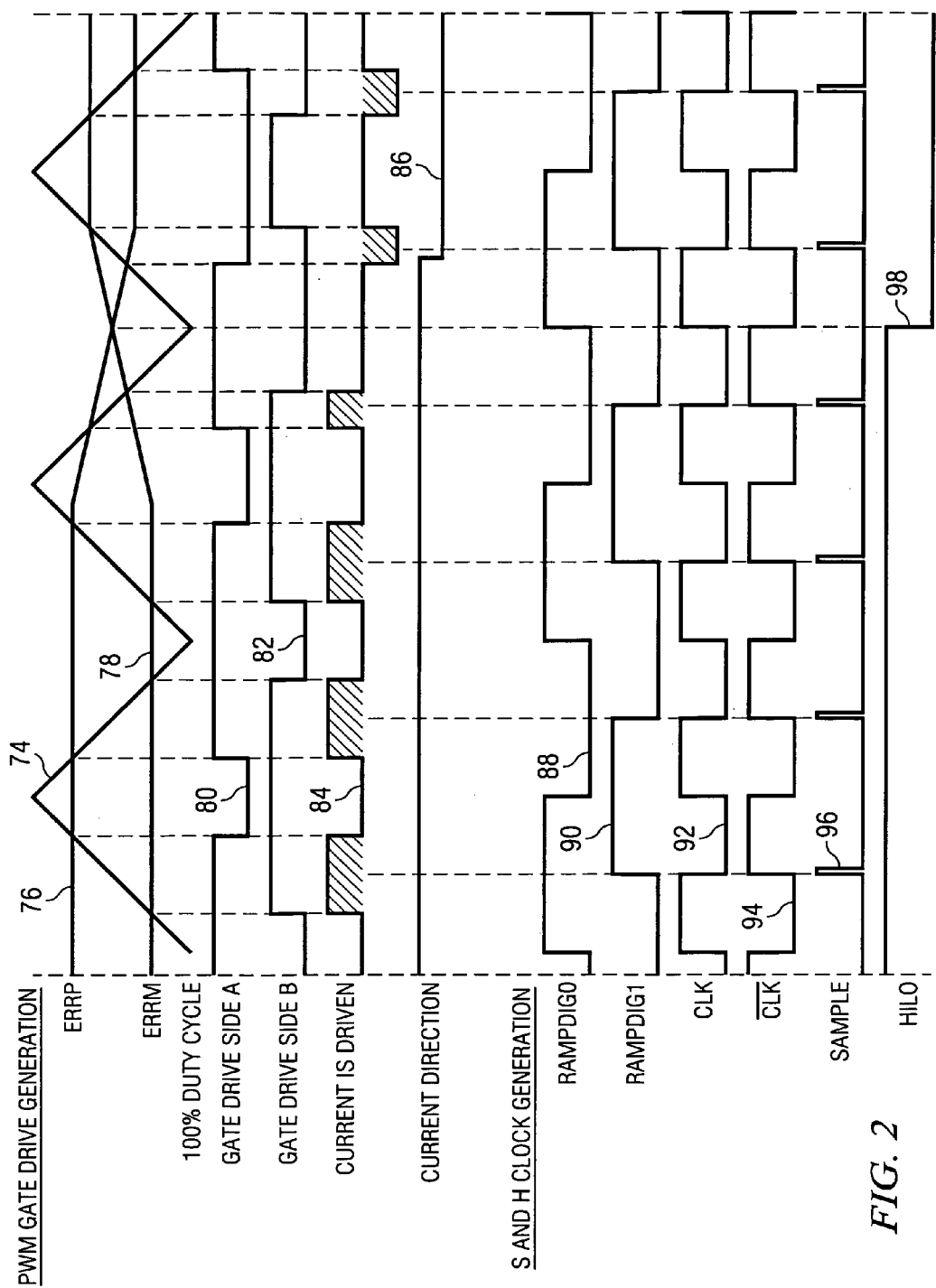
FIG. 2 depicts a timing diagram of signals in a motor control system implemented according to an aspect of the present invention.

FIG. 2 depicts an example of a timing diagram associated with operation of the system 10 shown and described with respect to FIG. 1. A RAMP signal 74 (e.g., generated by the ramp generator 46) is utilized for implementing the PWM control relative to differential error signals 76 and 78. The differential error signals 76 and 78, which are centered about VREF, generally correspond to the outputs from the differential amplifier 40, which are produced in response to the ERR signal. Corresponding comparators 42 and 44 provide corresponding raw gate control signals that are processed, such as by implementing control logic, to provide corresponding gate control signals 80 and 82 for driving switch devices on side A and side B, respectively. In the illustrated example for dual-sided PWM control, the signal 80 (corresponding to GPA and GNA) is utilized to drive switch devices 14 and 16 associated with the VCMA side and the signal 82 (corresponding to GPB and GNB) is utilized to generate gate control signals for driving switching devices 18 and 20 associated with the VCMB side of the motor 12.

For example, when the signal 80 is high, the low-side switch device 16 is closed and when the signal 80 is low, the high-side switch device 14 is closed, thereby pulling VCMA high. Similarly, when the signal 82 is high, the switch device 18 is closed thereby pulling VCMA high, and when the signal 82 is low, switch device 20 is closed to pull VCMB low. The PWM cycles for the signals 80 and 82 can be centered relative to each other to facilitate dual-sided PWM control of the motor 12. As mentioned above, it is the overlap of the respective signals 80 and 82 and the relative operation of the respective switch devices 14, 16, 18 and 20 that controls the current 84 through the motor 12. Additionally, the relative duty cycle between the top side switch devices 14 and 18 relative to the bottom side switch devices 16 and 20 generally determines the direction of the current flow through the motor 12, which direction is indicated at 86. The signals 80 and 82, as shown in FIG. 2, are pulse-width modulated at twice the period (or one-half the frequency) that the current 84 is pulse width modulated.

The RAMPDIG0 signal is depicted at 88 in FIG. 2. The RAMPDIG1 signal provided by the comparator 70 is indicated at 90, which corresponds to a comparison to the VREF signal relative to the RAMP signal 74. Exclusive-OR gate 72 combines the signals 88 and 90 to provide a corresponding positive clock generation signal (CLK) 92. The positive clock generation signal 92 can be inverted by circuitry of the sample hold control logic 68 to provide a corresponding negative clock generation control signal ($\overline{\text{CLK}}$) 94. The respective positive-to-negative transition associated with signal 92 and the negative-to-positive transition associated with the signal 94 are utilized to generate the sample control signal 96 that is provided to the sample circuitry 26 (FIG. 1). The HILO signal is depicted at 98 in FIG. 2. The HILO signal 98 corresponds to the signal provided by the comparator 62.

Figure 3:
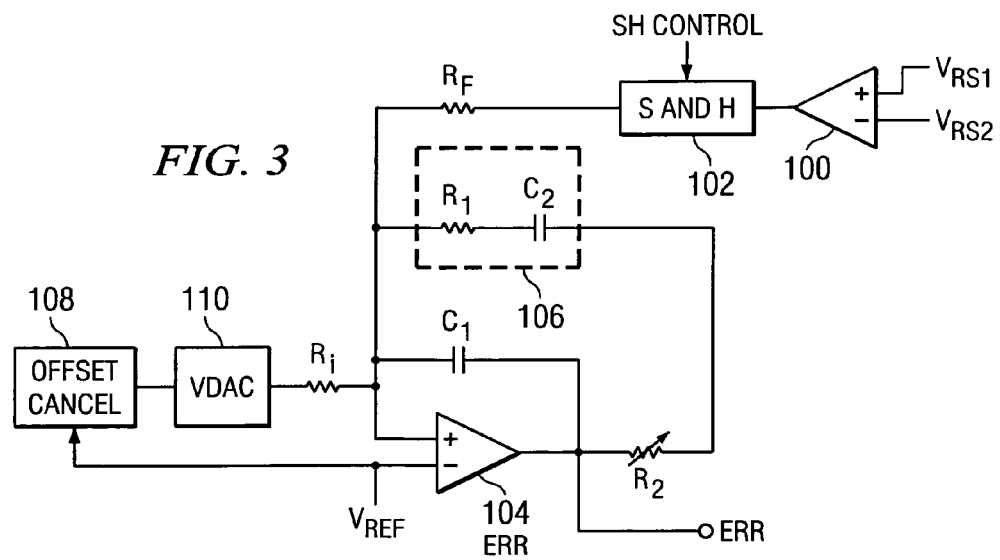
FIG. 3 depicts an example of a feedback path that can be utilized in a motor control system according to an aspect of the present invention.

FIG. 3 depicts an example of part of a feedback path that can be implemented in a closed loop motor control system according to an aspect of the present invention. The circuitry illustrated in FIG. 3 includes a current sense amplifier 100 that amplifies a voltage drop across a corresponding current sense resistor indicated at inputs $V_{RS1}$ and $V_{RS2}$. The amplified output voltage is provided to an input of a sample and hold network (S+H) 102. The sample and hold network 102 operates in response to a sample control signal from associated control logic (see, e.g., sample and hold control logic 68 of FIG. 1). As described herein, the sample control signal is provided as a function of the ERR signal that is generated as part of the feedback path depicted in FIG. 3.

As described herein, the sample and hold network 102 can be activated to sample the output of the current sense amplifier 100 near a center of a pulse of current in a corresponding PWM period. By activating the sample hold network 102 near the center of a PWM period, associated switching noise at the side of the H-bridge from which the $V_{RS1}$ and $V_{RS2}$ signals are obtained can be mitigated. Those skilled in the art will understand and appreciate various sample hold networks that can be utilized to sample and hold the amplified current sense signal.

The sample hold network 102 provides the sampled voltage (indicative of mean current) to an input of an error amplifier 104 through a corresponding feedback resistor RF. A capacitor C1 is coupled across the input of the error amplifier and the output of the error amplifier to remove high frequency noise from the feedback path. A feedback compensation network 106 is also coupled across the error amplifier 104 across. In the example of FIG. 3, the compensation network 106 is coupled between the inverting input of the error amplifier 104 and a variable resistor R2 that is connected at the output of the error amplifier 104. A reference voltage $V_{REF}$ is provided to the non-inverting input of the error amplifier 104. The error amplifier 104 provides the ERR signal based on the sample voltage current signal relative to $V_{REF}$.

The compensation network 106 is depicted as an RC network having a resistor R1 coupled and series with a capacitor C2. The values of R1 and C2 are selected and configured so that the transconductance gain of the control system when operating in the PWM mode, substantially matches the transconductance gain associated with the control system when operating in the linear mode. By substantially matching the transconductance gain for both the linear and PWM modes, less noise and improved performance can be achieved when transitioning between the linear and PWM modes. The gain matching characteristics is also particularly useful in high performance applications, such as in the context of controlling a voice coil motor of a disk drive system.

Stated differently, in the context of a transfer function representation, the compensation network 106 is configured to provide a zero that compliments a dominant low frequency pole associated with the inductance of a voice coil motor. As a result, a motor control system for a disk drive system implementing the portion of the feedback network depicted in FIG. 3 can easily switch at high frequencies between the linear and PWM modes without exhibiting transients or glitches.

The portion of the feedback network depicted in FIG. 3 can also include circuitry to implement offset correction. For example, an offset cancellation network 108 receives the VREF signal. The offset cancellation network 108 generates a digital DC offset signal based on VREF. The offset cancellation network 108 provides the digital offset value to a voltage digital-to-analog converter (VDAC) 110. The VDAC 110 converts the digital offset to a correspond analog offset that is applied through a resistor $R_i$ to the inverting input of the error amplifier 104. The offset is provided to correct for error associated with circuitry that provides the indication of sensed current so as to establish a corresponding zero current point.

Figure 4:
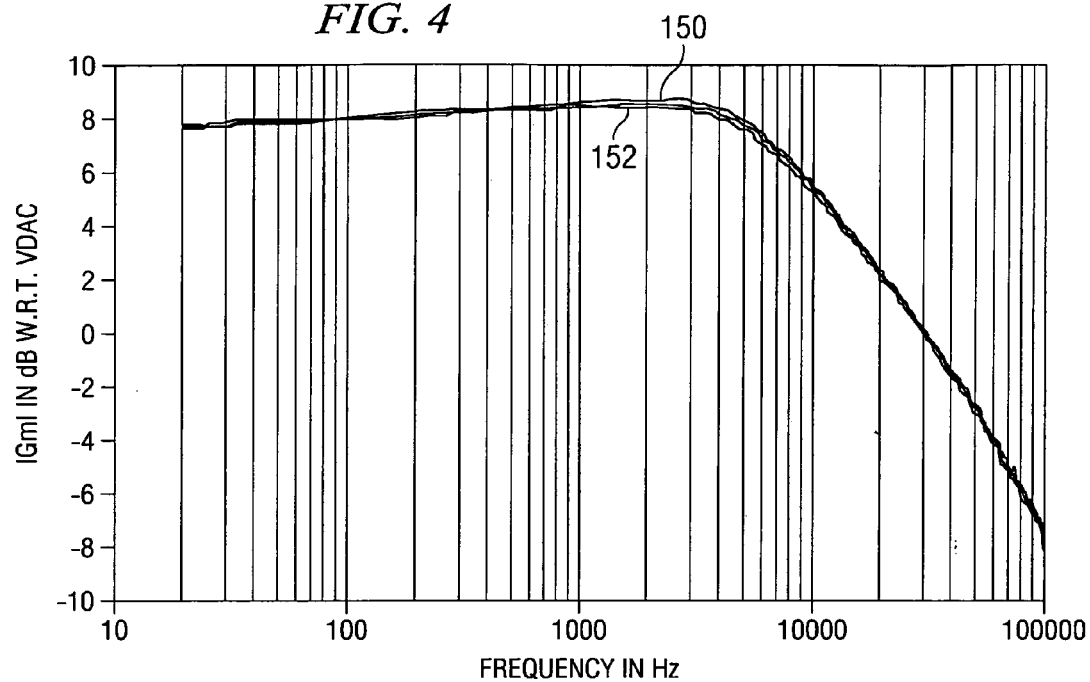
FIG. 4 is a Bode plot depicting a frequency response for gain magnitude of a motor control system operating in linear and PWM modes according to an aspect of the present invention.
Figure 5:
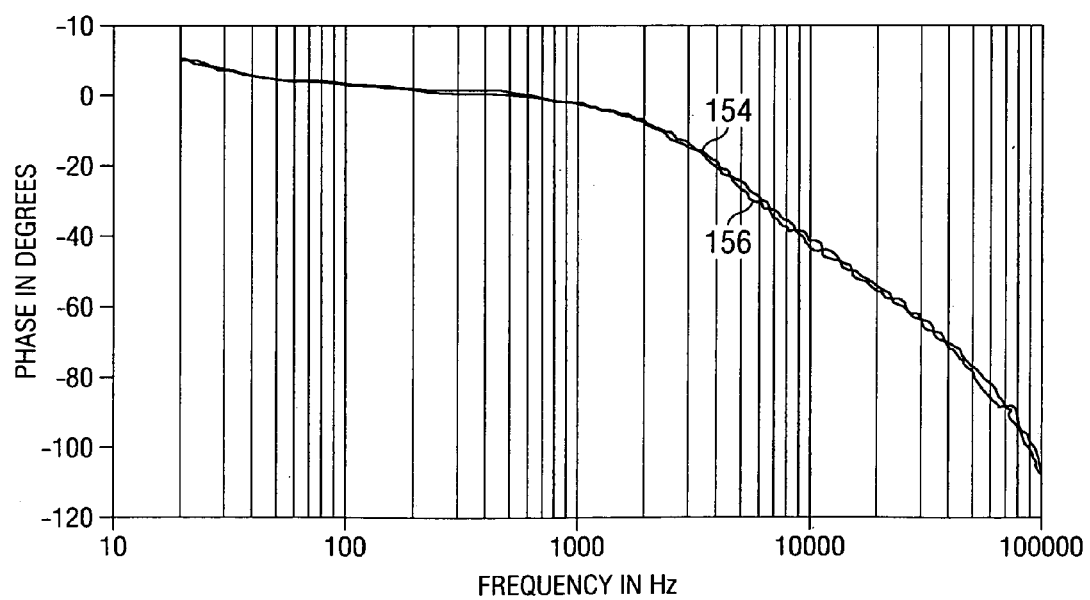
FIG. 5 is a Bode plot depicting a frequency response for gain phase of a motor control system operating in linear and PWM modes according to an aspect of the present invention.

FIGS. 4 and 5 are bode plots representing respective magnitude and phase gain characteristics for a closed loop motor control system implementing both linear and PWM modes, respectively, according to an aspect of the present invention. As depicted in FIG. 4, the DC gain or magnitude (in dB) 150 and 152 is substantially identical for both linear and PWM modes over a range of frequencies. FIG. 5 depicts the corresponding phase response (in degrees) 154 and 156 for respective linear and PWM modes over the same frequency range utilized in FIG. 4. The phase responses 154 and 156 are also substantially identical over the range of frequencies.

With reference to FIGS. 3, 4 and 5, when a feedback network, such as depicted in FIG. 3, is utilized as an input to a PWM control loop and to a linear control loop, such as depicted in FIG. 1, improved performance can be achieved relative to many existing closed loop control systems. For example, the linear mode control loop and the PWM control loop can be approximated as a transfer function representation having single dominant pole that is associated with the voice coil motor. The dominant pole that is associated with the voice coil motor is compensated over the same bandwidth by a zero provided by the compensation network 106 across the error amplifier 104. The gain matching characteristics, as shown in FIGS. 4 and 5, thus mitigate the introduction of noise in dual mode systems when switching between the respective linear and PWM modes.

Figure 6:
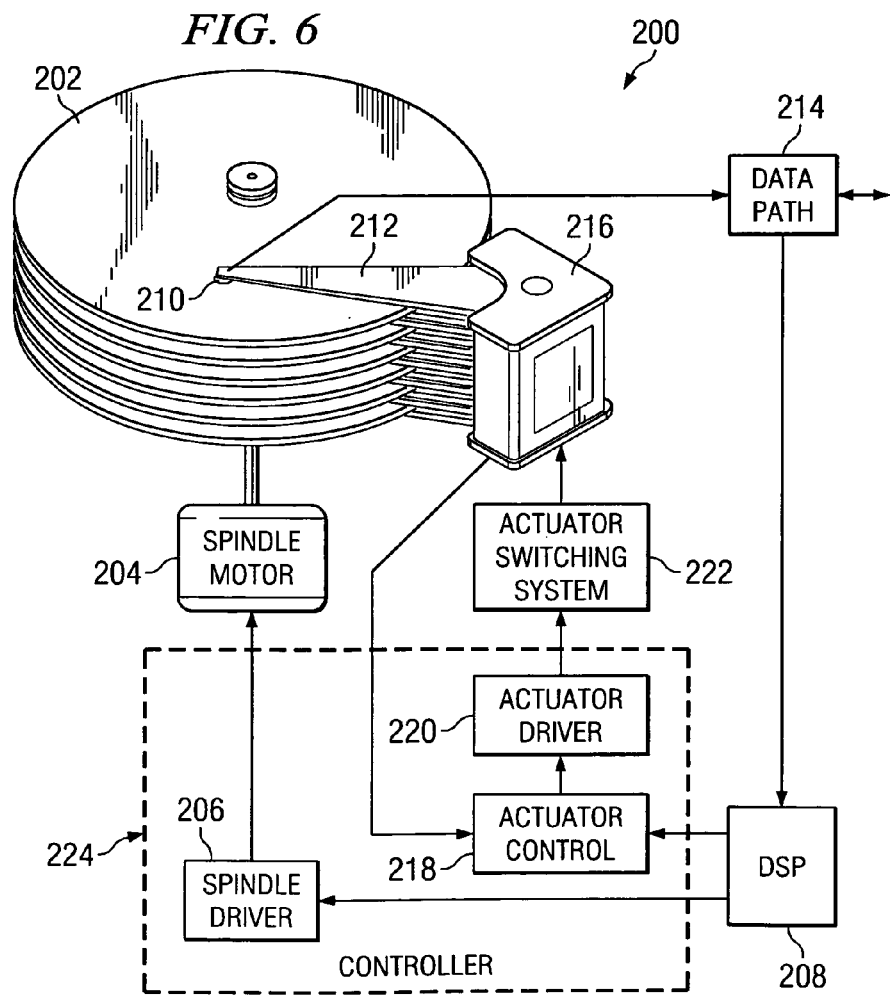
FIG. 6 depicts a schematic block diagram of a disk drive system that can be implemented according to an aspect of the present invention.

FIG. 6 depicts an example of a disk drive system 200 that can be constructed according to an aspect of the invention. The disk drive system 200 includes one or more magnetic media disks 202 that are rotated by spindle motor 204 in response to control signals provided by a spindle driver 206. A digital signal processor (DSP) 208 can be programmed and/or configured to provide instructions to control the spindle driver to drive the spindle motor 204 for rotating the spindle at a desired rate. The spindle motor 204 can be a multi-phase motor or a single phase motor.

A data transducer 210 is disposed at the end of one or more positioning arms 212. The transducer 210 provides the read/write head of disk drive system 200. In the case multiple disks are employed, multiple positioning arms 212 are provided, each having one or more data transducers 210. An actuator motor (e.g., a voice coil motor (VCM)) 216 operates to pivot positioning arm 212 to locate data transducer 210 at selectable radial tracks of disk 202. The radial tracks of each disk 202 contain track identification data, location information, and synchronization data that are used for operation of disk drive system 200. Data transducer 210 can be utilized both to record (or write) user data to and read user data from an associated disk 202. The transducer 210 can also detect signals that identify the tracks and sectors of the disk 202 at which data are written, as well as detect servo bursts that enable the head to be properly aligned laterally with the tracks of the disk. Analog electrical signals that are generated by the head 18 in response to the magnetic signals recorded on disk 202 are provided to a data path 214 for eventual communication to and from a host computer system (not shown).

Servo signals that are prerecorded on the disk 202, in either digital or analog form, are detected and demodulated by one or more servo demodulator circuits (not shown). The DSP 208 can process the servo signals to control the actuator motor 216 that is operative to move the position of the arm 212 to adjust the position of the data transducer 210 relative to the disk 202. The DSP (or other control circuitry) 208 provides control instructions to actuator control circuitry 218. The actuator control circuitry 218 provides corresponding control signals to an actuator driver 220, based on the DSP instructions as well as based on feedback from the actuator motor 216 (e.g., corresponding to an error signal), as described herein. The feedback can correspond to an error signal that is produced based on current sensed from a single side of the actuator motor 216 relative to a reference signal. The actuator control 218 and driver 220 (forming part of a control loop) can operate in a dual mode that includes both a linear mode and a PWM mode. The control loop for the actuator motor 216 can provide closed loop control having feedback that is can be configured so that the transconductance gain for both the linear and PWM modes substantially matches to facilitate dynamically switching between such modes. The particular mode can vary according to the current requirements for driving the actuator motor 216, as instructed by the DSP 208.

The actuator driver 220 in turn operates an actuator switch system 222 to selectively energize the actuator motor 216, which energization can vary according to the mode (linear mode or PWM mode) of the system 200. The PWM mode utilized by the controller further can employ a double-sided PWM scheme or a single-sided PWM scheme, which scheme may be user configurable according to design requirements. The actuator driver 220 thus provides gate control signals to the actuator switching system 222 for supplying an appropriate amount of electrical current to drive the actuator motor 216 and thereby position the arm 212. The control loop for the actuator motor 216, including the driver 220 and the actuator control 218, can be embodied within a common microcontroller (or application specific integrated circuit (ASIC)) 224 with the spindle driver 206, which controls spindle motor 204. Alternatively, control loop for the actuator motor 216 can be integrated with other circuitry within disk drive system 200 according to design requirements.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, while many of the systems and features herein have generally been described in the context of controlling a voice coil motor in a disk drive system, the concepts are equally applicable to controlling other types of motors (e.g., having any number of phases), which can be employed in various contexts. For instance, the approach is useful in motor control systems and actuators that have the capability of operating in multiple modes (i.e., multiple amplifier classes). Accordingly, the present invention is intended to embrace all such alterations, modifications, and variations that fall within the spirit and scope of the appended claims.

What is claimed is:

1. A motor control system comprising:
a linear control system operative, in a linear mode, to provide a plurality of control signals for driving an associated motor based on an error signal;
control logic operative, in a pulse-width modulation (PWM) mode, to provide the plurality of control signals for driving the motor, at least some of the plurality of control signals being pulse-width-modulated signals based on the error signal;
an error system that generates the error signal based on an indication of a sensed electrical characteristic of the motor relative to a predetermined reference signal; and
a feedback network coupled across the error system, the feedback configured to have transfer function characteristics that substantially match responses in the linear mode and the PWM mode of motor control system.

2. The system of claim 1, wherein the control logic generates the plurality of control signals, when operating in the PWM mode, based on the error signal relative to the predetermined reference signal, a first set of the plurality of control signals being provided to control a first set of switch devices associated with a first side of the motor and a second set of the plurality of control signals being provided to control a second set of switch devices associated with a second side of the motor.

3. The system of claim 2, wherein the control logic further comprises:
a dual-sided control system operative, in a dual-sided PWM mode, to pulse-width modulate each of the first set and the second set of the plurality of control signals; and
a single-sided control logic operative, in a single-sided PWM mode, to provide the first set of the plurality of control signals for controlling direction of current through the motor and to pulse-width modulate the second set of the plurality of control signals to control a magnitude of the current through the motor.

4. The system of claim 3, wherein the single-sided control logic further comprises logic that is operative, in the single-sided PWM, to combine the first set and the second set of the plurality of control signals from the dual-sided control system to provide the second set of the plurality of control signals for use in controlling the magnitude of the current through the motor.

5. The system of claim 3, further comprising a sensor operatively connected at the first side of the motor, the sensor providing the indication of the sensed electrical characteristic of the motor.

6. The system of claim 3, further comprising selection logic that selectively enables the single-sided control logic based on a program signal.

7. The system of claim 1, further comprising a current sensor coupled to sample the indication of the sensed electrical characteristic of the motor as an indication of current through the motor, the indication of current through the motor being sampled in response to a sample control signal.

8. The system of claim 7, wherein the control logic further comprises sample control logic that provides the sample control signal based on the error signal, and
the system further comprises sample and hold circuitry that selectively samples the indication of the sensed current through the motor in response to the sample control signal, the sample and hold circuitry providing an indication of the sensed current through the motor as a sampled mean value of current through the motor.

9. The system of claim 1, wherein the feedback network further comprises a resistor and capacitor in series electrically coupled between an input and an output of the error system, the resistor and the capacitor being selected to provide a zero in a transfer function representation of the motor control system that substantially cancels a dominant pole associated with the motor in the transfer function representation.

10. A disk drive system comprising the motor control system of claim 1, wherein the motor comprises a voice coil motor operatively connected to position a positioning arm and transducer relative to at least one disk.

11. A closed loop motor control system comprising:
a linear driver system operative, in a linear mode, to provide a plurality of control signals for driving an associated motor based on an error signal;

control logic operative, in a pulse-width modulation (PWM) mode, to provide the plurality of control signals for driving the motor based on the error signal, the control logic comprising:
- a dual-sided control system operative to independently pulse-width modulate a first set of the plurality of control signals to control a first set of switch devices associated with a first side of the motor and a second set of the plurality of control signals to control a second set of switch devices associated with a second side of the motor; and
- a single-sided control system operative, when enabled, to provide the first set of the plurality of control signals for controlling direction of current through the motor and to pulse-width modulate the second set of the plurality of control signals generated to control a magnitude of the current through the motor; and
- an error system that generates the error signal based on a predetermined reference signal relative to an indication of sensed current through the motor.

12. The system of claim 11, a feedback network coupled across the error system, the feedback configured to have transfer function characteristics that substantially match frequency responses in the linear mode and the PWM mode of motor control system.

13. The system of claim 12, wherein the feedback network further comprises:
- a resistor; and
- a capacitor electrically coupled in series with the resistor between an input and an output of the error system, the resistor and the capacitor being selected to provide a zero in a transfer function representation of the motor control system that substantially cancels a dominant pole associated with the motor in the transfer function representation.

14. The system of claim 11, wherein the single-sided control system further comprises logic, when enabled to operate in the single-sided PWM mode, combines the first set of the plurality of control signals and the second set of the plurality of control signals from the dual-sided control system to provide the second set of switch devices with a modified second set of pulse width modulated control signals for use in controlling the magnitude of the current through the motor.

15. The system of claim 11, further comprising a current sensor coupled at the first side of the motor to sample and to provide the indication of the sensed current through the motor in response to a sample control signal.

16. The system of claim 15, wherein the control logic further comprises sample control logic that provides a sample control signal based on the error signal, and the system further comprises sample and hold circuitry that selectively samples the indication of the sensed current through the motor in response to the sample control signal, the sample and hold circuitry providing the indication of the sensed current through the motor as a sampled mean value of current through the motor.

17. The system of claim 11, further comprising selection logic that selectively enables the single-sided control logic.

18. A disk drive system comprising the motor control system of claim 11, wherein the motor comprises a voice coil motor operatively connected to position a positioning arm relative to at least one disk.

19. In a disk drive system, a closed loop motor control system comprising:
- first means, in a linear mode, for providing a plurality of control signals for driving an associated motor based on an error signal;
- second means, in a pulse-width modulation (PWM) mode, for providing the plurality of control signals for driving the motor based on the error signal, the second means comprising:
  - means for independently pulse-width modulating each of a first set of the plurality of control signals to control a first set of switch devices associated with a first side of the motor and a second set of the plurality of control signals to control a second set of switch devices associated with a second side of the motor;
  - means for providing the first set of the plurality of control signals for controlling direction of current through the motor and for pulse-width modulating the second set of the plurality of control signals generated to control a magnitude of the current through the motor; and
  - means for enabling operation of at least one of the means for independently pulse-width modulating and the means for providing; and
- means for generating the error signal based on a predetermined reference signal relative to an indication of sensed current through the motor.

20. The closed loop control system of claim 19, further comprising means for configuring a feedback network, which is operatively coupled across the means for generating the error signal, to provide a zero in a transfer function representation of the motor control system that substantially cancels a dominant pole associated with the motor in the transfer function representation.

* * * * *